(12) United States Patent
Lee

(10) Patent No.: US 7,219,927 B2
(45) Date of Patent: May 22, 2007

(54) STEERING COLUMN HAVING VARIABLE IMPACT-ABSORBING STRUCTURE

(75) Inventor: Byeong-Hoon Lee, Kyunggi-do (KR)

(73) Assignee: Hyundai Mobis Co., Ltd., Yongin-shi (KR)

(*) Notice: Subject to any disclaimer, the term of this patent is extended or adjusted under 35 U.S.C. 154(b) by 367 days.

(21) Appl. No.: 11/036,995

(22) Filed: Jan. 19, 2005

(65) Prior Publication Data

US 2006/0049621 A1    Mar. 9, 2006

(30) Foreign Application Priority Data

Sep. 7, 2004    (KR) .................... 10-2004-0071360

(51) Int. Cl.
*B62D 1/00* (2006.01)
(52) U.S. Cl. .................. 280/777; 74/492; 74/493; 188/371
(58) Field of Classification Search ............. 280/775, 280/777; 74/492, 493; 188/371, 374
See application file for complete search history.

(56) References Cited

U.S. PATENT DOCUMENTS

| | | | | |
|---|---|---|---|---|
| 2,578,903 A | * | 12/1951 | Smith .................. | 188/374 |
| 4,978,138 A | * | 12/1990 | Hikone et al. ........... | 280/777 |
| 5,375,881 A | * | 12/1994 | Lewis ................. | 280/777 |
| 5,547,221 A | * | 8/1996 | Tomaru et al. .......... | 280/777 |
| 5,609,364 A | * | 3/1997 | Fouquet et al. ......... | 280/777 |
| 5,669,633 A | * | 9/1997 | Naff et al. ............ | 280/777 |
| 5,788,278 A | * | 8/1998 | Thomas et al. .......... | 280/777 |
| 6,170,874 B1 | * | 1/2001 | Fosse .................. | 280/777 |
| 6,189,929 B1 | * | 2/2001 | Struble et al. ......... | 280/777 |
| 6,322,103 B1 | * | 11/2001 | Li et al. .............. | 280/777 |
| 6,454,302 B1 | * | 9/2002 | Li et al. .............. | 280/777 |
| 6,478,333 B1 | * | 11/2002 | Barton et al. .......... | 280/777 |
| 6,575,497 B1 | * | 6/2003 | McCarthy et al. ........ | 280/777 |
| 6,764,098 B2 | * | 7/2004 | Matsumoto et al. ....... | 280/777 |
| 6,769,715 B2 | * | 8/2004 | Riefe et al. ........... | 280/777 |
| 7,118,131 B2 | * | 10/2006 | Manwaring et al. ....... | 280/777 |
| 2002/0167157 A1 | | 11/2002 | Matsumoto et al. | |

* cited by examiner

*Primary Examiner*—Paul N. Dickson
*Assistant Examiner*—Toan C. To
(74) *Attorney, Agent, or Firm*—Greenblum & Bernstein, P.L.C.

(57) ABSTRACT

A steering column having a variable impact-absorbing structure includes an inner column tube, an outer column tube disposed at an outer circumferential part of the inner column tube, a guide fixed to an outer circumferential surface of the outer column tube, a strap having a deformable part fitted into the guide, a pin inserted through the strap and configured to be slidable into the guide, a solenoid that drives the pin, and a control unit that controls the solenoid. The steering column further includes a sensor that senses a state of a driver and outputs the sensing result to the control unit, wherein the strap comprises a plurality of parallel wires, one end of each wire being opened and the other end of each wire being connected to each other in a closed state, and a suspending end that is bent in a loop shape is formed on the closed end to enable the inner column tube to be suspended thereon.

9 Claims, 4 Drawing Sheets

STEERING COLUMN HAVING VARIABLE IMPACT-ABSORBING STRUCTURE

RELATED APPLICATIONS

The present disclosure relates to subject matter contained in priority Korean Application No. 10-2004-0071360, filed on Sep. 7, 2004, which is herein expressly incorporated by reference in its entirety.

BACKGROUND OF THE INVENTION

1. Field of the Invention

The present invention relates in general to a steering column of a vehicle, more specifically, to a steering column having a variable impact-absorbing structure that varies absorption of the impact energy according to a physique of a driver, thereby minimizing an injury upon the driver.

2. Description of the Related Art

In general, a steering column of a vehicle is supported by an upper and a lower part of the body of a car. The upper support structure includes a tilt for tilt operation of the steering column, and the lower support structure includes a hinge for tilting the steering column as a whole.

During a collision, a driver is often bumped secondarily into the steering wheel, so the steering wheel should be designed to absorb secondary collision impact. Moreover, the steering column should be stopped from being pushed to the rear where the driver is seated even when the front of the car is crushed from the collision.

Therefore, at impact, the support structures of the steering column fixed to the body of the car are designed to help the steering column make a relative movement to the body of the car. This can be realized by building the steering column to make a relative movement from its support structures at impact, or designing the support structures and the steering column as one body so that they move together relative to the body of the car.

Particularly, U.S. 2002/0167157 A1 disclosed an impact-absorbing structure having a metal strap that causes plastic deformation as the steering column and the body of a car move relative to each other during a car crash.

In the disclosure, the impact-absorbing structure includes a steering column on which a steering shaft is rotatably mounted in the circumferential direction, a supporter for supporting the steering column to the body of a car, and an energy absorber mounted on at least one of the steering column and the body of the car in order to vary absorption of the impact energy, depending on whether a driver wears a seat belt or not.

However, the above impact-absorbing structure was designed to adjust the energy absorption depending on whether the driver wears a seat belt, and it was not necessarily built in consideration with weight of the driver or physical conditions of the driver in different postures. Therefore, there was a limit to protect the driver from injuries as much as possible.

Moreover, the structure of the variable impact energy absorbing device was so complicated that overall process or assembly was very difficult to carry out. This resulted in low productivity and disappointing profits.

In addition, the energy absorber itself was composed of one strap in a band shape, so it could not get various strain energies, and this eventually turned collision related tuning to its own physical property.

SUMMARY OF THE INVENTION

It is, therefore, an object of the present invention to provide a steering column having a variable impact-absorbing structure capable of variably absorbing impact energies that best fit for the physique of a driver and thereby, minimizing an injury upon the driver, in which if the driver has a small physique, a pin is separated through a solenoid and a small load is absorbed during a collision, but if the driver has a large physique, the pin is inserted into the strap and a large load is absorbed during the collision.

To achieve the above object, there is provided a steering column having a variable impact-absorbing structure including: an inner column tube; an outer column tube disposed at an outer circumferential part of the inner column tube; a guide fixed to an outer circumferential surface of the outer column tube; a strap having a deformable part fitted into the guide; a pin inserted through the strap and configured to be slidable into the guide; a solenoid that drives the pin; a control unit that controls the solenoid; and a sensor that senses a state of a driver and outputs a sensing result to the control unit, wherein the strap comprises a plurality of parallel wires, one end of each wire being opened and the other end of each wire being connected to each other in a closed state, and a suspending end that is bent in a loop shape is formed on the closed end to enable the inner column tube to be suspended thereon.

In an exemplary embodiment, one side of the guide is connected to the solenoid, the other side of the solenoid is fixed onto the outer column tube through a bracket, and a recess is formed inwardly on a bottom of the guide to receive the strap.

In an exemplary embodiment, the strap includes: suspending parts disposed inside the guide and connected to the suspending end to enable the pin to suspend thereon; and free end parts extended from the suspending parts to be disposed outside of the outer column tube.

In an exemplary embodiment, a groove is perforated at the outer column tube into which the suspending end is inserted.

In an exemplary embodiment, the sensor includes a weight sensor that senses weight of a driver, and a position sensor that senses a driving position.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
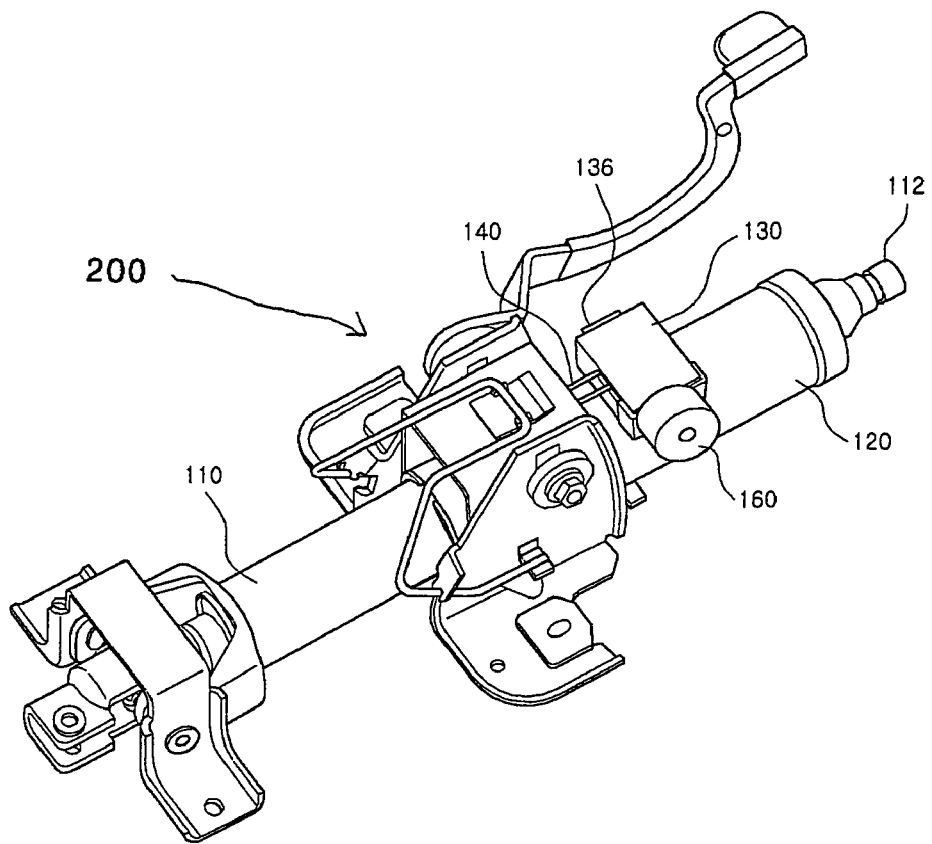
FIG. 1 is a perspective view of a steering column having an impact-absorbing structure according to one embodiment of the present invention.
Figure 2:
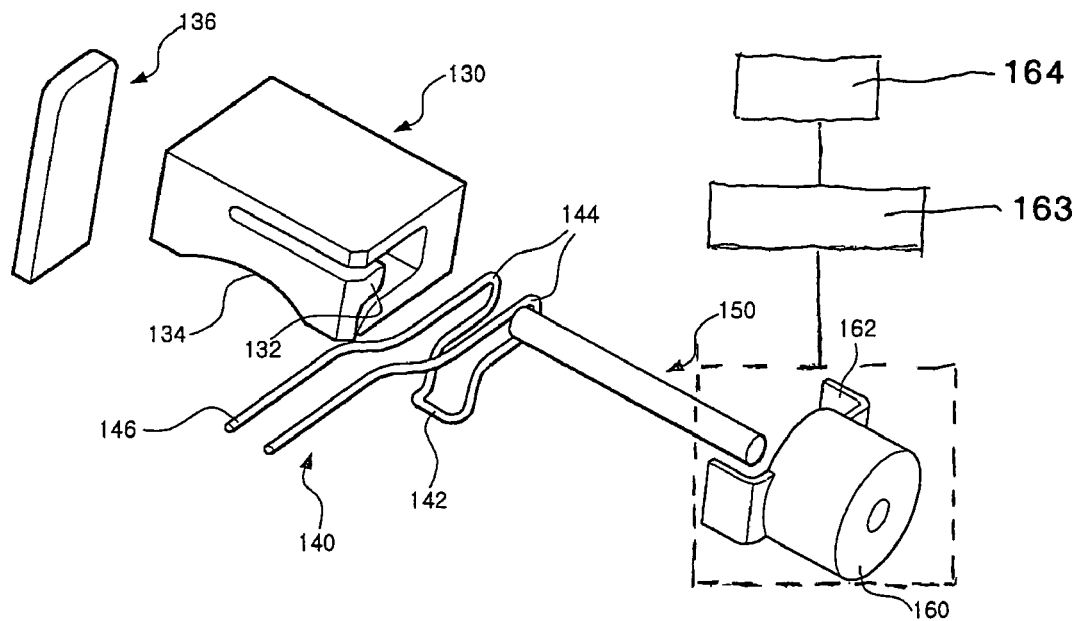
FIG. 2 is an exploded perspective view illustrating key components of FIG. 1, combined with a block diagram illustrating connections among solenoid, control unit and sensor.
Figure 3:
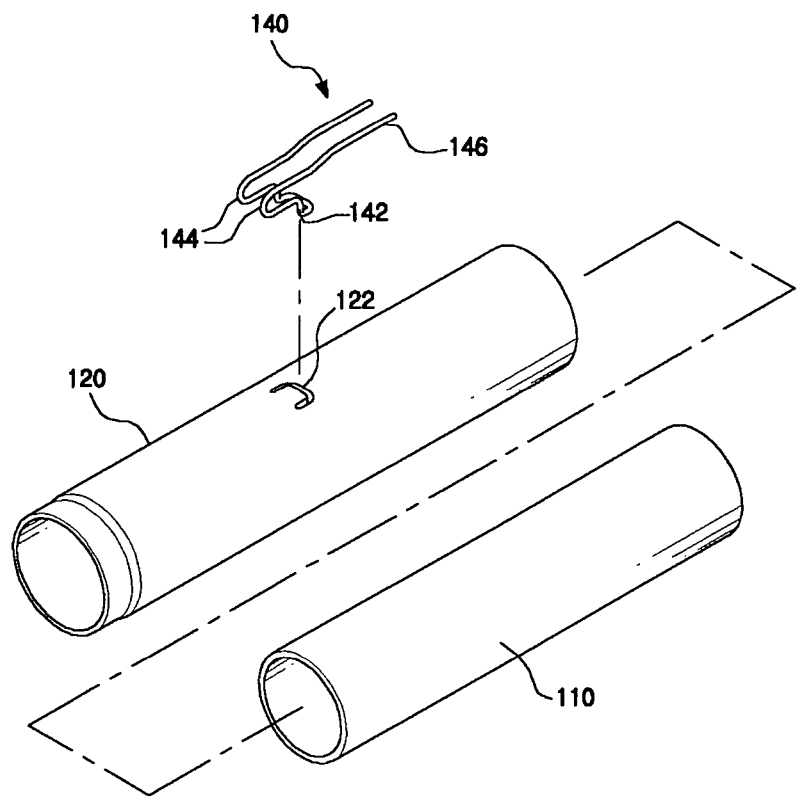
FIG. 3 is an exploded perspective view illustrating an assembly between a strap and a column tube of the present invention.
Figure 4:
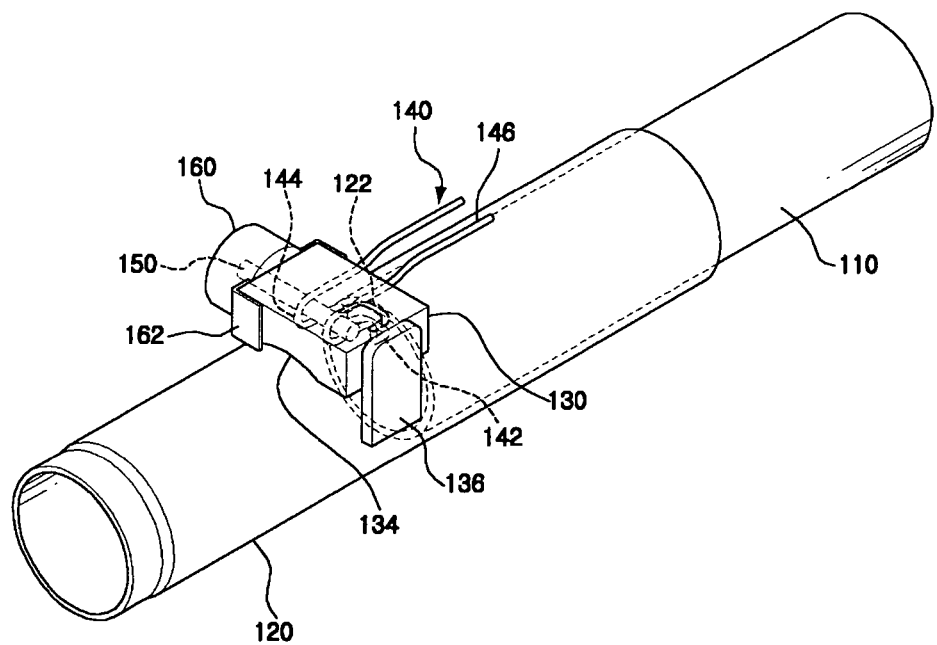
FIG. 4 is a partial perspective view illustrating in detail a peripheral structure of a guide of the present invention.

FIG. 1 is a perspective view of a steering column having an impact-absorbing structure according to one embodiment of the present invention, the view being taken from a bottom part of the steering column. FIG. 2 is an exploded perspective view illustrating key components of FIG. 1. FIG. 3 is an exploded perspective view illustrating an assembly between a strap and a column tube of the present invention, and FIG. 4 is a partial perspective view illustrating in detail a peripheral structure of a guide of the present invention.

Referring to FIGS. 1 to 4, the steering column 200 according to one embodiment of the present invention includes an inner column tube 110, an outer column tube 120, a guide 130 fixed to the outer column tube 120, a strap 140 having a deformable part curved into the guide 130, a pin 150 detachably attached to the strap 140 and fitted into the guide 130, and a solenoid 160 for driving the pin 150.

Inside the inner column tube 110 is a steering shaft 112 that is rotatably attached to a steering wheel (not shown).

The outer column tube 120 is slidably connected to the circumferential part of the inner column tube 110.

The strap 140 includes two parallel wires, one end of each wire being opened and not connected while the other end of each wire being connected to each other forming a closed state.

Particularly, on the closed end of the strap 140 is a suspending end 142 that is bent in a loop shape so that the inner column tube 110 slid by an impact to the direction of the steering column shaft can be suspended on.

Also, the strap 140 includes suspending parts 144 bent in a loop shape and connected to the suspending end 142, so the pin 150 inserted into the guide 130 can be suspended thereon.

Meanwhile, the strap 140 has free end parts 146 that are connected to the suspending parts 144 in the inside of the guide 130 and are disconnected from each other in the outside of the guide 130.

Moreover, a groove 122 to which the suspending end 142 is inserted is perforated at the outer column tube 120.

In other words, the suspending end 142 of the strap 140 is inserted into the groove 122, and is protruded downwards in a certain width from the inner circumferential surface of the outer column tube 120. In this manner, when collided with the inner column tube 110, it can be suspended.

On the other hand, the guide 130 is attached to the bottom of the outer column tube 120 to guide the movement of the pin 150, and at the same time to ensure that the pin 150 is guided along a stably modified path following the deformation of the strap 140.

As shown in FIG. 2, the guide 130 has a zigzag shaped inner structure in correspondence to the shape of the suspending parts 144 of the strap 140, and there is an expanded space at the center where the pin 150 is inserted.

Sometimes, the strap 140 is deformed while the pin 150 is being separated from the suspending parts 144 of the strap 140. To closely support the suspending parts 144 in such case, a support part 132 having a shape corresponding to the suspending parts 144 is formed inside of the guide 130.

One side of the guide 130 is united with a bracket 136 and is fixed onto the outer circumferential surface of the outer column tube 120.

To be in correspondence to the above, the solenoid 160 is fixed through the bracket 162 to the other surface of the guide 130 to slidably retreat the pin 150 in accordance with an electric signal that is applied from outside.

And, a recess 134 is formed on the guide 130's bottom surface being in contact with the outer column tube 120. Because of the presence of the recess 134, there is secured a certain amount of space between the guide 130 and the outer column tube 120, which enables the deformed strap 140 to move within the space.

The solenoid 160 is turned on/off in response to an electric signal applied from outside, and functions as an actuator moving the pin 150 to the horizontal direction perpendicular to the steering column shaft.

The present invention further includes a control unit 163 controlling the solenoid 160, and a sensor 164 sensing the state of a driver and outputting its sensing result to the control unit.

The sensor includes a weight sensor for sensing the weight of the driver, and a position sensor for measuring a relative distance between the steering wheel and the driver.

The weight sensor can be installed on a driver's seat, and the position sensor senses the position (or location) of the seat to find out where the seat is located with respect to the steering wheel.

With the aid of the weight sensor and the position sensor, it becomes possible to sense physical conditions of the driver on a seat, and to realize the variable impact-absorbing structure that is customized according to the physique of the driver.

As already seen in the present invention, by composing the strap 140 of more than two wires, it becomes possible to obtain various strain energies, which in turn makes a collision related tuning operation much easier.

Also, by installing the guide 130 capable of guiding the deformation of the suspending parts 144 of the strap 140, the suspending parts 144 are more stably wounded during a secondary collision with the driver and thus, the energy absorption efficiency of the steering column is improved.

The following will now explain in more detail the operational principle of the present invention.

Figure 5:
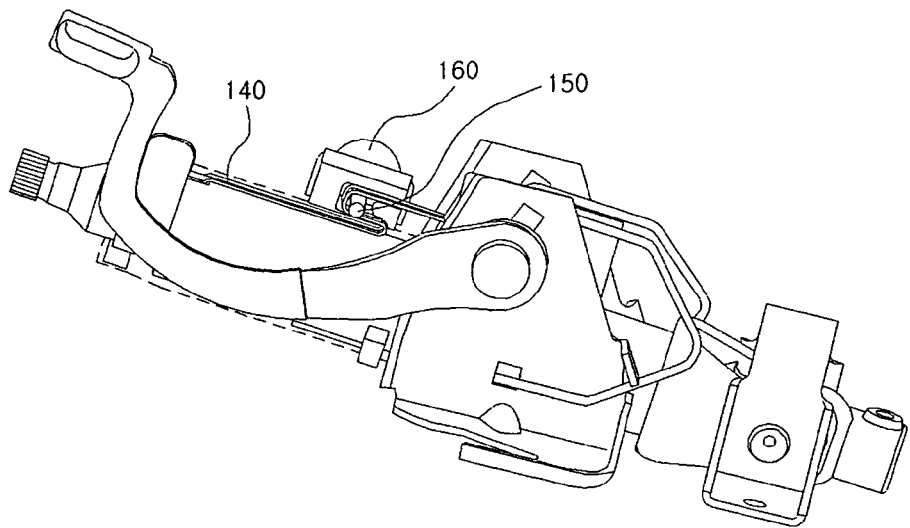
FIG. 5 diagrammatically illustrates an operational state in which a strap is deformed under an application of large impact loads.
Figure 6:
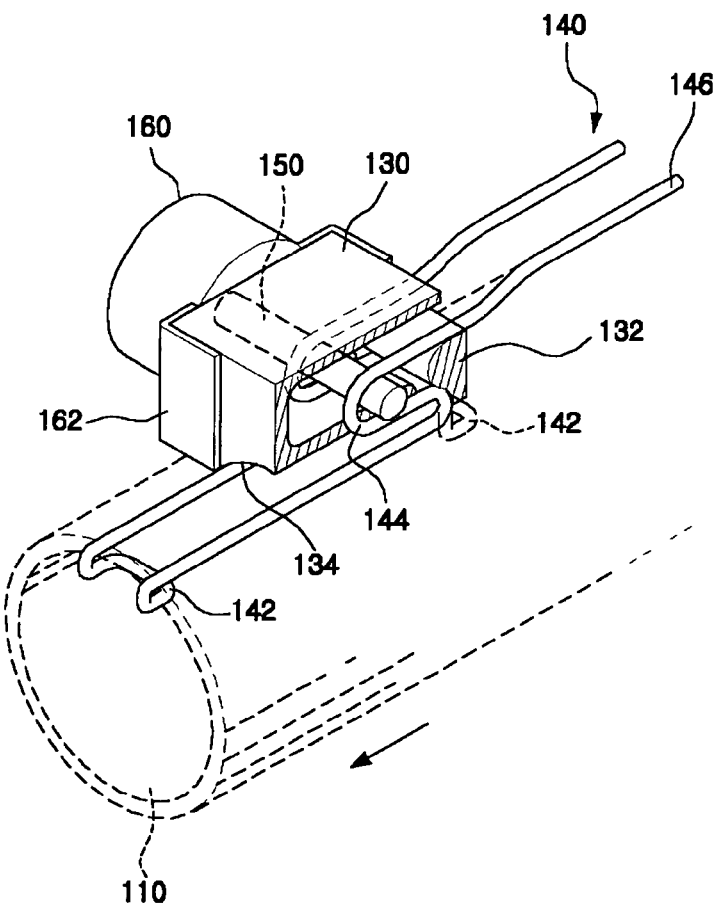
FIG. 6 illustrates in detail a positional relation between a pin and a strap of FIG. 5.
Figure 7:
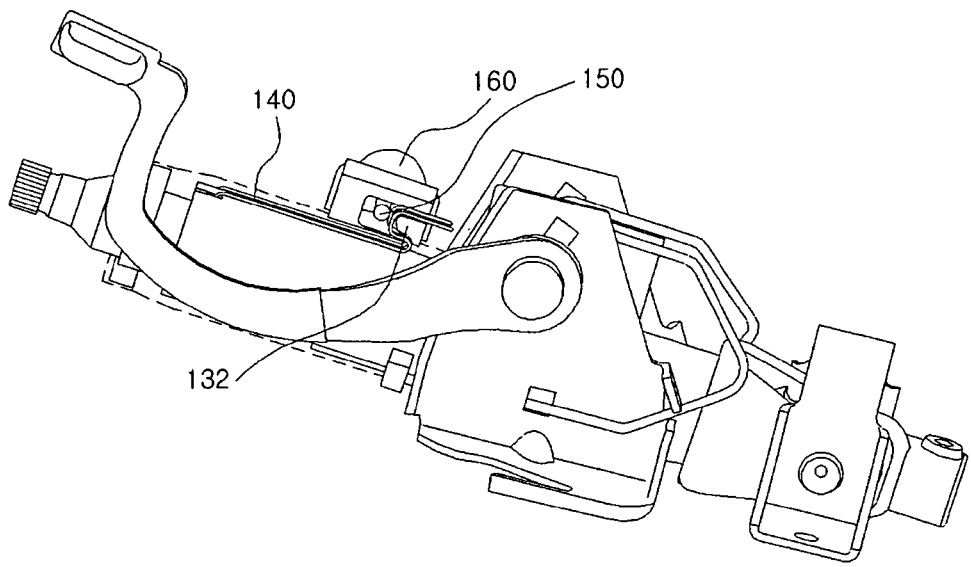
FIG. 7 diagrammatically illustrates an operational state in which a strap is deformed under an application of small impact loads.
Figure 8:
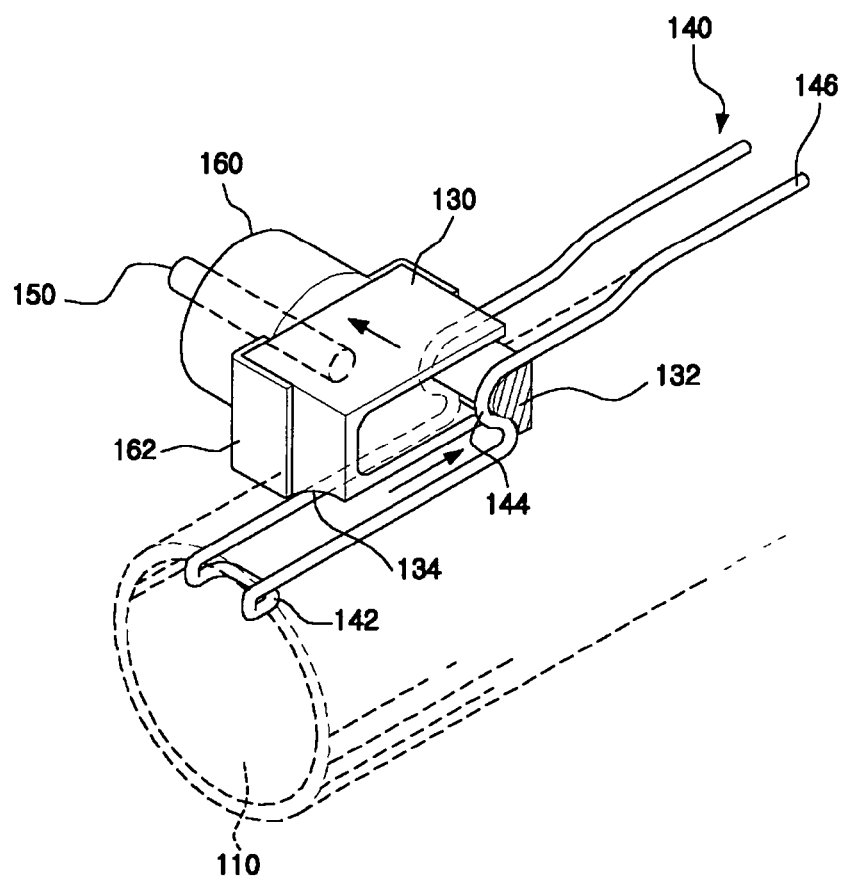
FIG. 8 illustrates in detail a positional relation between a pin and a strap of FIG. 7.

FIG. 5 diagrammatically illustrates an operational state in which a strap is deformed under an application of large impact loads; FIG. 6 illustrates in detail a positional relation between a pin and a strap of FIG. 5; FIG. 7 diagrammatically illustrates an operational state in which a strap is deformed under an application of small impact loads; and FIG. 8 illustrates in detail a positional relation between a pin and a strap of FIG. 7.

The weight sensor and the position sensor installed in the vehicle sense the weight of the driver and a present position of the driver's seat, and send their sensing results to the control unit.

Then, the control unit evaluates the input signals from the sensors, and sends back to the solenoid 160 only a control signal that is proper for the physical condition of the driver.

To see the normal setting structure before the collision with reference to FIGS. 5 and 6, the solenoid 160 is usually in off state, and the pin 150 is inserted between the suspending parts 144 of the strap 140.

The above state is an operation mode that fits for a driver having a large physique, so a relatively large impact energy can be absorbed.

On the other hand, if the driver has a small physique according to a value sensed by the sensor, the control unit sends a corresponding signal to the solenoid 160 to turn on the solenoid 160. At this time, the pin 150, as shown in FIGS. 7 and 8, becomes separated from the suspending part 144 of the strap 140.

The above state is an operation mode that fits for a driver having a small physique, so a relatively small impact energy can be absorbed.

In this collision standby state, if a secondary collision occurs to the steering column 200 after the car collision, the inner column tube 110 pushes the suspending end 142 forward along the relative sliding motions of the inner column tube 110 and the outer column tube 120, and continues to plastically deform the strap, thereby absorbing the impact.

If the driver has a large physique, the pit 150 inserts between the suspending parts 144 of the strap 140, and guides to elongate the deformation path of the strap 140, whereby the steering column can absorb a large impact energy.

In contrast, if the driver has a small physique, the pint 150 gets separated from the suspending parts 144 of the strap 140, and the deformation path of the strap 140 is shortened. In such case, a smaller deformation load is applied and thus, a small impact energy is absorbed during the collision.

In conclusion, the steering column tube having a variable impact-absorbing structure has the following advantages.

First, by varying the deformation path of the strap according to the physical condition of the driver, it becomes possible to absorb an impact energy that fits for the physique of the driver during a secondary collision between the steering column and the driver that occurs following a car crash, so that injuries upon the driver can be minimized.

Second, by composing the strap of a plurality of wires, various strain energies can be obtained and a collision related tuning operation becomes much easier.

Third, by forming at the closed end portion of the strap a loop-shaped suspending end on which the inner column tube can be suspended, it becomes easier to absorb impact by the simple suspension structure with the inner column tube.

Fourth, by installing the guide for guiding the deformation of the suspending parts of the strap, the suspending parts are more stably wounded during the collision, and this resultantly increases energy absorption efficiency of the steering column.

Fifth, by employing the solenoid as an actuator for sliding the pin to the guide, the present invention can be simply and easily realized without the aid of a complicated institutional structure.

Sixth, by forming the recess on the bottom of the guide, a certain amount of space is created between the guide and the outer column tube. Thus, without creating an additional space for the deformation of the strap, an enough space for the deformation of the strap is secured and thus, the space usage of the peripheral part can be improved.

Seventh, by perforating the groove at the outer column tube for the suspending end of the strap to be inserted therein, the outer circumferential structure of the outer column tube as well as the suspending structure with the inner column tube are much simplified. This eventually makes the installation of the strap simple and easy.

Eighth, by installing the weight sensor and the position sensor for sensing the weight and driving position of the driver, the steering column is ready for more effectively absorbing impact energies that vary depending on the physical conditions of drivers.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A steering column having a variable impact-absorbing structure comprising:
    an inner column tube;
    an outer column tube disposed at an outer circumferential part of the inner column tube;
    a guide fixed to an outer circumferential surface of the outer column tube;
    a strap having a deformable part fitted into the guide;
    a pin inserted through the strap and configured to be slidable into the guide;
    a solenoid that drives the pin;
    a control unit that controls the solenoid; and
    a sensor that senses a state of a driver and outputs the sensing result to the control unit, wherein the strap comprises a plurality of parallel wires, one end of each wire being opened and the other end of each wire being connected to each other in a closed state, and a suspending end that is bent in a loop shape is formed on the closed end to enable the inner column tube to be suspended thereon.

2. The steering column according to claim 1, wherein one side of the guide is connected to the solenoid, the other side of the guide is fixed onto the outer column tube through a bracket, and a recess is formed inwardly on a bottom of the guide to receive the strap.

3. The steering column according to claim 1, wherein the strap comprises:
    suspending parts disposed inside the guide and connected to the suspending end to enable the pin to suspend thereon; and
    free end parts extended from the suspending parts to be disposed outside of the outer column tube.

4. The steering column according to claim 2, wherein the strap comprises:
    suspending parts disposed inside the guide and connected to the suspending end to enable the pin to suspend thereon; and
    free end parts extended from the suspending parts to be disposed outside of the outer column tube.

5. The steering column according to claim 3, wherein a groove is perforated at the outer column tube into which the suspending end is inserted.

6. The steering column according to claim 4, wherein a groove is perforated at the outer column tube into which the suspending end is inserted.

7. The steering column according to claim 1, wherein the sensor comprises a weight sensor for sensing weight of a driver, and a position sensor for sensing a driving position.

8. The steering column according to claim 5, wherein the sensor comprises a weight sensor that senses weight of a driver, and a position sensor that senses a driving position.

9. The steering column according to claim 6, wherein the sensor comprises a weight sensor that senses weight of a driver, and a position sensor that senses a driving position.

* * * * *